United States Patent

Greene, Jr.

US 10,967,589 B1

(10) Patent No.: US 10,967,589 B1
(45) Date of Patent: Apr. 6, 2021

(54) TIRE MOLD WITH INTERCHANGEABLE ELEMENT HAVING REMOVABLY ATTACHABLE LAMELLE

(71) Applicants: Compagnie Generale des Etablissements Michelin, Clermont-Ferrand (FR); Jonathan Greene, Jr., Spartanburg, SC (US)

(72) Inventor: Jonathan Greene, Jr., Spartanburg, SC (US)

(73) Assignee: Compagnie Generale Des Etablissements Michelin, Clermont-Ferrard (FR)

( * ) Notice: Subject to any disclaimer, the term of this patent is extended or adjusted under 35 U.S.C. 154(b) by 116 days.

(21) Appl. No.: 16/488,441

(22) PCT Filed: Mar. 31, 2017

(86) PCT No.: PCT/US2017/025374
§ 371 (c)(1),
(2) Date: Aug. 23, 2019

(87) PCT Pub. No.: WO2018/182686
PCT Pub. Date: Oct. 4, 2018

(51) Int. Cl.
*B29D 30/06* (2006.01)
*B29C 33/10* (2006.01)
*B29C 33/30* (2006.01)

(52) U.S. Cl.
CPC ........ *B29D 30/0629* (2013.01); *B29C 33/10* (2013.01); *B29C 33/306* (2013.01);
(Continued)

(58) Field of Classification Search
CPC ............ B29D 30/0606; B29D 30/0629; B29D 2030/0613; B29D 2030/0617; B29C 33/306
See application file for complete search history.

(56) References Cited

U.S. PATENT DOCUMENTS 2,593,547 A * 4/1952 Duerksen ............... B22D 19/00
249/83
3,553,790 A 1/1971 Brobeck et al.
(Continued)

FOREIGN PATENT DOCUMENTS

EP 2425952 A1 3/2012
JP 2005212430 A 8/2005
(Continued)

OTHER PUBLICATIONS

European Patent Office; International Search Report and Written Opinion for patent application PCT/US2017/025374; International filing date Mar. 31, 2017; Published European Patent Office, Rijswijk, Netherlands, dated Dec. 4, 2017, pp. 1-11, enclosed.

*Primary Examiner* — James P Mackey
(74) *Attorney, Agent, or Firm* — Neal P. Pierotti (57) ABSTRACT

A mold (10) for forming a tire (12) is provided that has an interchangeable element (14) configured for engaging the tire (12) and forming a section of tread (16) of the tire (12) when the tire (12) is molded by the mold (10). A lamelle (18) is removably attachable to the interchangeable element (14) and is configured for engaging the tire (12) and forming a sipe (20) of the section of tread (16) of the tire (12). The lamelle (18) is removably attachable in that the lamelle (18) is configured to be attached to the interchangeable element (14) and then removed from attachment to the interchangeable element (14).

15 Claims, 6 Drawing Sheets (52) U.S. Cl.
CPC .. *B29D 30/0606* (2013.01); *B29D 2030/0613* (2013.01); *B29D 2030/0616* (2013.01); *B29D 2030/0617* (2013.01)

(56) References Cited

U.S. PATENT DOCUMENTS

| | | | | |
|---|---|---|---|---|
| 4,553,918 | A | * | 11/1985 | Yoda ................. B29D 30/0606 425/46 |
| 5,340,294 | A | * | 8/1994 | Kata ....................... B29C 33/10 264/219 |
| 8,215,939 | B2 | * | 7/2012 | Takagi ............... B29D 30/0606 425/46 |
| 8,323,013 | B2 | | 12/2012 | Jenkins |
| 9,592,645 | B2 | * | 3/2017 | Tanaka ................. B29C 33/424 |

FOREIGN PATENT DOCUMENTS

| | | |
|---|---|---|
| KR | 20020092664 A | 12/2002 |
| WO | 2016184692 A1 | 11/2016 |

\* cited by examiner

TIRE MOLD WITH INTERCHANGEABLE ELEMENT HAVING REMOVABLY ATTACHABLE LAMELLE

CROSS-REFERENCE TO RELATED APPLICATION

The present application is a 35 U.S.C. § 371 application of PCT/US17/25374 filed on Mar. 31, 2017 and entitled "Tire Mold with Interchangeable Element Having Removably Attachable Lamelle." PCT/US17/25374 is incorporated by reference herein in its entirety for all purposes.

FIELD OF THE INVENTION

The present invention relates generally to a mold for the formation of tires. More particularly, the present application involves a mold that features interchangeable elements in which lamelles are non-permanently attached to the interchangeable elements so that they can be attached to and removed from the interchangeable elements.

BACKGROUND

The production of tires includes the step of placing an uncured tire within a mold at which time heat and pressure is applied to the uncured tire in order to change its state to a cured condition. During the curing process, the uncured tire is placed inside of a metal mold that surrounds the exterior of the uncured tire. An expandable rubber bladder is positioned inside of the uncured tire, when it is within the mold, and can be expanded in order to apply pressure to the inside surface of the uncured tire. Steam, hot water, or inert gas can be transferred into the expandable bladder in order to cause it to assume an expanded state. The pressure applied by the expandable bladder forces the uncured tire against the mold to cause the uncured tire to be under pressure forces. Heat may be simultaneously applied, and the combination of heat and pressure applied for a particular time effects the curing process. The cured tire may then be removed from the mold and transported downstream for subsequent processing.

The expandable bladder when inflated and applying force causes the crown portion of the tire to be forced against a garniture of the mold that includes a series of features that form grooves, sipes, and tread blocks of the tire to result in the formation of the tread design of the tire. The garniture can be made of a single piece or made of multiple sections that are arranged in a circle. The garniture may have interchangeable elements that include the architecture that engage the tire and form the tread features. The interchangeable elements can be removed and replaced with other, differently configured interchangeable elements to provide flexibility in the construction of tires without having to scrap or otherwise change out the entire garniture. The sipes of the tread pattern are small grooves that are 2 millimeters or less in width. The sipes are formed by lamelles of the interchangeable elements that are thin pieces of metal, usually steel, around which rubber is forced to result in the formation of the sipes. The lamelle may be initially formed and then subsequent to its formation, the interchangeable element may be injection molded around the lamelle to result in the finished piece. The lamelle is generally formed of steel while the interchangeable element is usually formed of a different material such as aluminum. Although the interchangeable element itself may be removed and replaced, if one desires the lamelle to instead be substituted with a different lamelle the entire interchangeable element with the permanently attached lamelle must all be removed. This results in less flexibility in the modification of the garniture, more waste, and less freedom in the methods of construction of the interchangeable element. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

A mold is provided that features interchangeable elements 14 that can be attached to and removed from the mold so that variations in the formation of the tire tread 16 can be readily achieved. Lamelles 18 that are used to form sipes 20 in the tire tread 16 are removably attached to the interchangeable elements 14 so that the lamelles 18 as well can be quickly and easily removed and replaced with other types/sizes of lamelles 18 to achieve the desired sipes 20. The interchangeable elements 14 may be made of two portions 22, 24 that can be separated from one another and between which the lamelles 18 are located so that the lamelles 18 can be accessed for removal and insertion from and into the interchangeable elements 14. The lamelles can be rendered removably attachable in a number of manners such as through mechanical fasteners 32 or interlocking arrangements 34. The provided arrangement allows for the interchangeable elements 14 to be constructed through processes such as 3D printing and casting with subsequent machining without having to form the lamelle into the interchangeable elements by way of injection molding. The interchangeable elements 14 need not be scrapped if one desires a change in the lamelle 18, as instead the desired lamelle 18 could be substituted.

Figure 1:
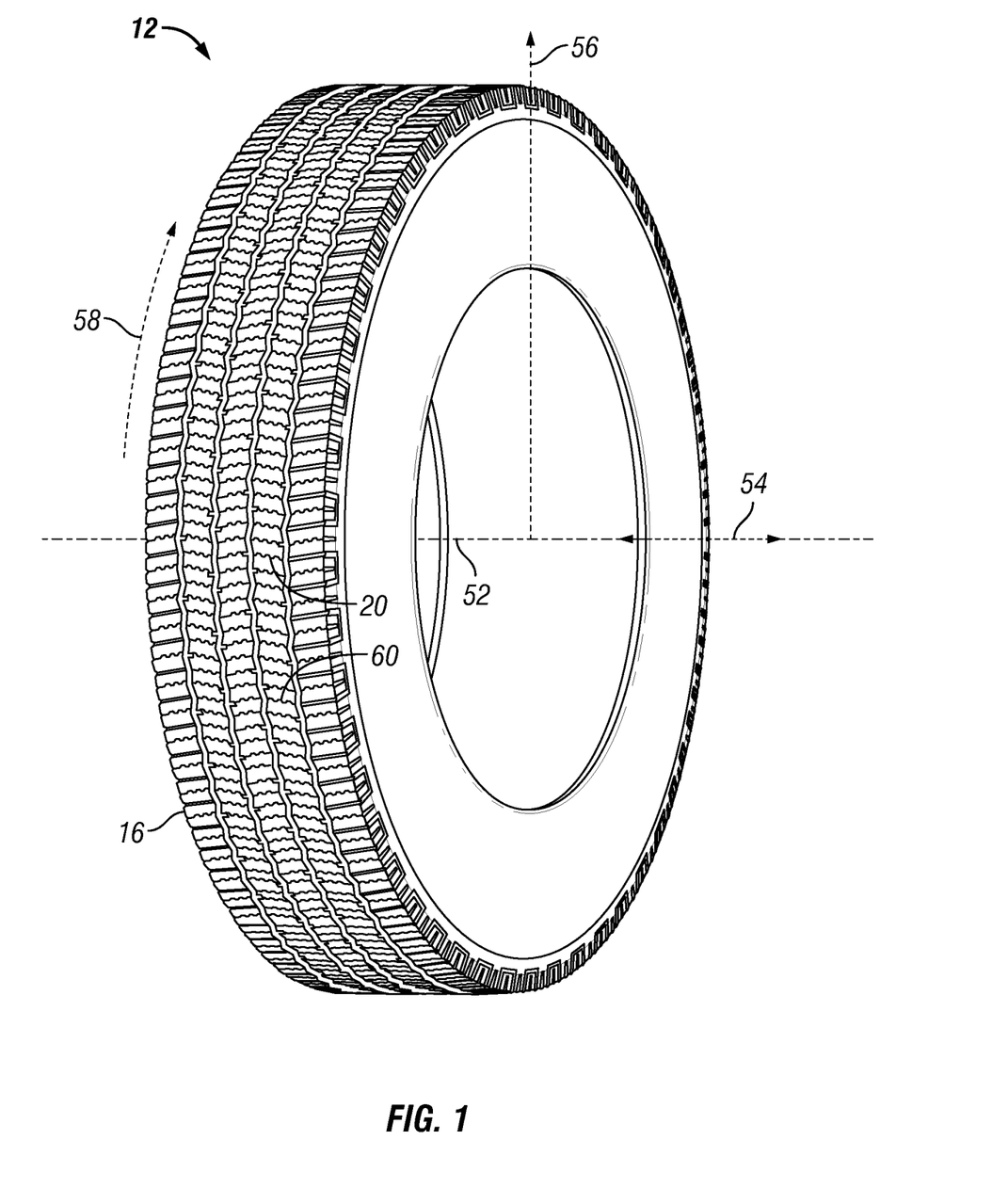
FIG. 1 is a perspective view of a tire.

With reference to FIG. 1, a tire 12 is illustrated in perspective view that has a central axis 52 that serves as the axis of rotation of the tire 12. The central axis 52 extends through the center of the tire 12 and is aligned in the axial direction 54. The radial direction 56 of the tire 12 extends outward from the central axis 52 and is perpendicular to the central axis 52. The tire 12 also has a circumferential direction 58 that extends around the circumference of the tire 12 and circles the central axis 52. The circumferential direction 58 may be located at any distance from the central axis 52 in the radial direction 56 of the tire 12, and need not be located only at the tread 16 or the outer most portion of the tire 12 in the radial direction 56.

The tire 12 has tread 16 that features a series of tread block 60 that are separated in the axial direction 54 by a series of grooves 62. The grooves 62 may run the entire length of the tire 12 in the circumferential direction 58. Additional grooves 62 may run in the axial direction 54 and can be disposed between the various tread blocks 60 to cause them to be distinct. If grooves 62 do not separate the tread blocks 60 in the axial direction 54, the tread blocks 60 are organized as ribs that run the entire length of the tire 12 in the circumferential direction 58. Tread blocks 60 set up in the shape of ribs are illustrated in FIG. 1. Smaller grooves can be present in areas of the tread 16, such as the tread blocks 60, and these smaller grooves are known as sipes 20. A sipe 20 is defined as a groove of the tread 16 that has a width that is 2 millimeters or less. The grooves 62 of the tread 16 may thus be grooves that have widths that are greater than 2 millimeters. The sipes 20 are shown as having a zig-zag portion, but it is to be understood that the sipes 20 can have lengths extending in other shapes as desired. The sipes 20 may extend completely in the axial direction 54, or may extend at an angle to the axial direction 54 so that the sipes 20 in effect extend both in the axial direction 54 and in the circumferential direction 58. The sipes 20 may have a depth in the radial direction 56 to the bottom of the tread 16, or to some depth that is just above the bottom of the tread 16 in the radial direction 56. The crown of the tire 12 includes the tread 16, and a pair of sidewalls extend from the crown on either side in the axial direction 54. Depending upon the tire 12 geometry, some features of the tread 16, such as sipes 20 and grooves 62, may extend into the sidewalls as well.

Figure 2:
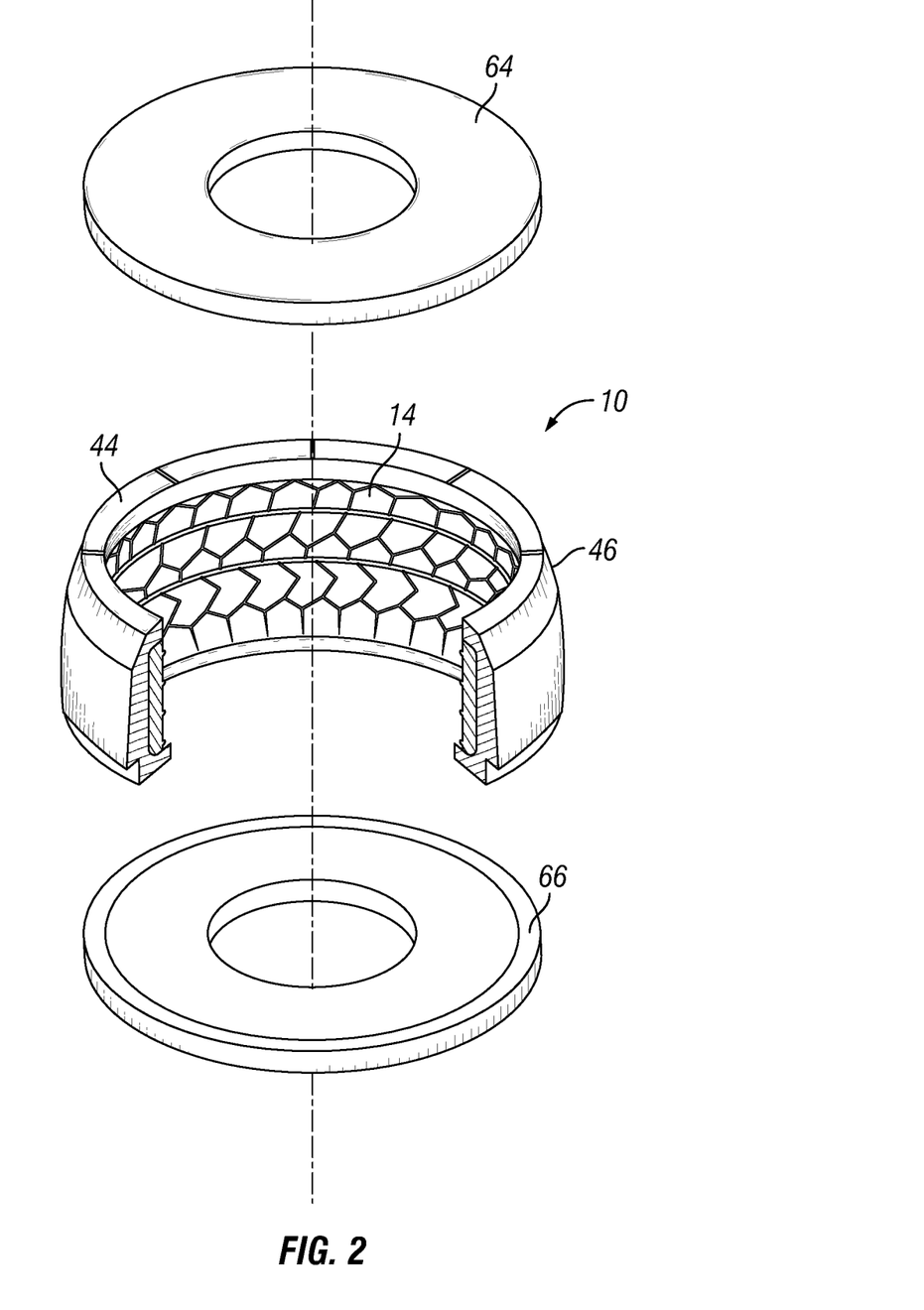
FIG. 2 is an exploded perspective assembly view of a mold.

FIG. 2 shows a mold 10 for curing a tire 12. A tire 12 that is made of uncured rubber is placed into the mold 10 and cured via heat and pressure applied by the mold 10. The mold 10 can be configured in a variety of ways. In the embodiment illustrated, the mold 10 includes a garniture 46 that has a series of sectors 42 that include interchangeable elements 14 that engage the tire 12 to form the tread 16 of the tire 12. The mold 10 also includes a top mold section 64 and a bottom mold section 66 that engage the sidewalls of the tire 12 and form the sidewall portions. In other arrangements, additional top and bottom mold sections 64, 66 can be included and thus multiple other components may be present in the mold 10 for forming the tire 12. The green/unmolded tire 12 can be placed inside of the garniture 46 and the top and bottom mold sections 64, 66 may be moved into engagement with the garniture 46. An inflatable bladder is placed through one of the sections 64, 66 and inside of the tire 12 and is inflated in order to press the tire 12 against the interchangeable elements 14 and against the insides of the top and bottom mold sections 64, 66. Heating elements can be located within the various elements 46, 64 and 66 or they may be otherwise heated in order to transfer heat into the tire 12 that is within the mold 10. In this manner, the mold 10 is capable of applying heat and pressure to the tire 12 that is within the mold 10. Although described as all being moveable, it may be the case that some of the elements 46, 64 and 66 are not movable while others are in fact movable to open and close the mold 10. The elements 46, 64 and 66 may be movable in that they move relative to the ground onto which the mold 10 rests.

The bladder can be inflated with air, steam, liquid, nitrogen, or any other fluid to cause it to expand to force the tire 12 against the tread 16 and sidewall forming portions of the mold 10. After sufficient heat and pressure are applied to the tire 12 for a sufficient amount of time, the bladder can be deflated and the top and/or bottom mold sections 64, 66 can be moved away from the garniture 46 to allow the cured tire 12 to be removed for subsequent processing.

Figure 3:
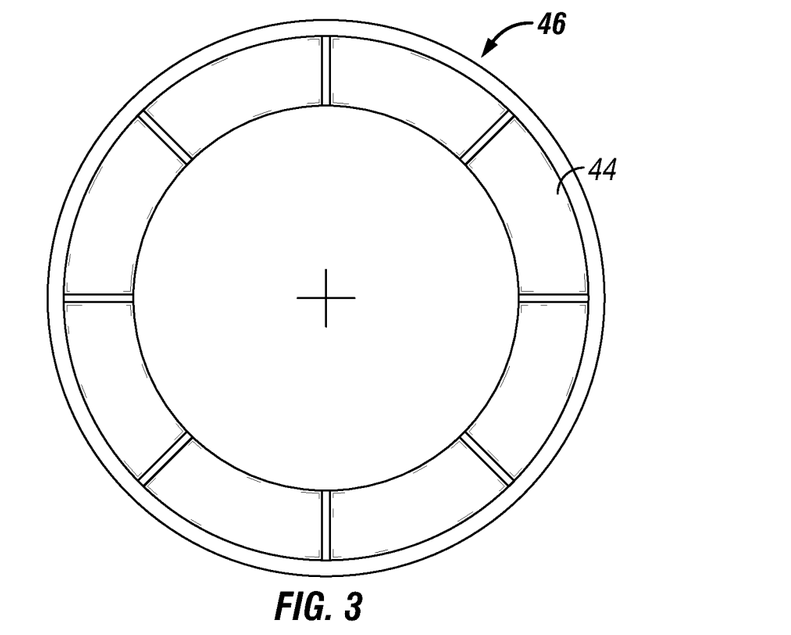
FIG. 3 is a top view of a garniture of the mold.

With reference to FIG. 3, the garniture 46 of the mold 10 is made of a plurality of sectors 44 that extend 360 degrees about an axis. The sectors 44 may be in engagement with one another, or a small space could be present between the sectors 44. In some arrangements, the sectors 44 can move in the radial direction towards the central axis to further add pressure to the tire 12 during curing. In other instances, the sectors 44 are stationary and do not move in the radial direction. The sectors 44 can be the same size as one another, or may be different sizes from one another. Although 8 sectors 44 are shown, it is to be understood that the garniture 46 can include any number of sectors 44 in other arrangements. For example, from 9-12 sectors 44 can be included in the garniture 46 in other versions of the mold 10. Still further, although described as having sectors 42, the garniture 46 could in fact be composed of zero sectors 44 in other arrangements in which the garniture 46 is a single, solid piece that extends around its central axis.

One of the sectors 42 of the plurality of sectors 44 is illustrated with reference to FIG. 4. The sector 42 includes a frame onto which a plurality of interchangeable elements 14 are mounted. The interchangeable elements 14 have a series of geometrical features that form the corresponding features of the tread 16 when the tire 12 is molded. The interchangeable elements 14 are interchangeable in that they can be attached to the sector 42 and used to mold a tire 12, and then subsequently detached from the sector 42 and replaced with a different interchangeable element 14. Additionally the same interchangeable element 14 that was removed could subsequently be reattached back to the sector 42. In this regard, the interchangeable element 14 is removably attachable to the sector 42 in that it can be removed from the sector 42 and then subsequently reattached. The swapping of interchangeable elements 14 gives the tire builder flexibility in constructing different tire 12 architecture without having to scrap the entire garniture 46, or in some instances without having to even change out other ones of the interchangeable elements 14 as one may desire a change in only a section of the tread 16 be made. The interchangeable elements 14 thus offer flexibility in the construction of the tire 12 as opposed to sectors 42 that do not feature elements that can be removed from and subsequently reattached back.

The interchangeable elements 14 may have features that are the same as others in the sector 42, or may be unique from others in the sector 42 depending upon the desired architecture of the tread 16. Any number of interchangeable elements 14 can be present in the sector 42, and they may be arranged in a single row, a pair of rows, or any number of rows or columns within the sector 42. As illustrated in FIG. 4, the interchangeable elements 14 are presented in a pair of rows and are all identical in configuration to one another. The interchangeable elements 14 may be rendered releasably attachable to the sector 42 in a number of manners. For instance, the sector 42 could have features that interlock with counterpart features of backs of the interchangeable elements 14 to hold them against the sector 42. The interchangeable elements 14 could be pressed against the sector 42 and held thereon through a friction fit engagement. Mechanical fasteners could be used to attach the interchangeable elements 14 to the sector 42 to allow them to be both attachable and removable.

Figure 4:
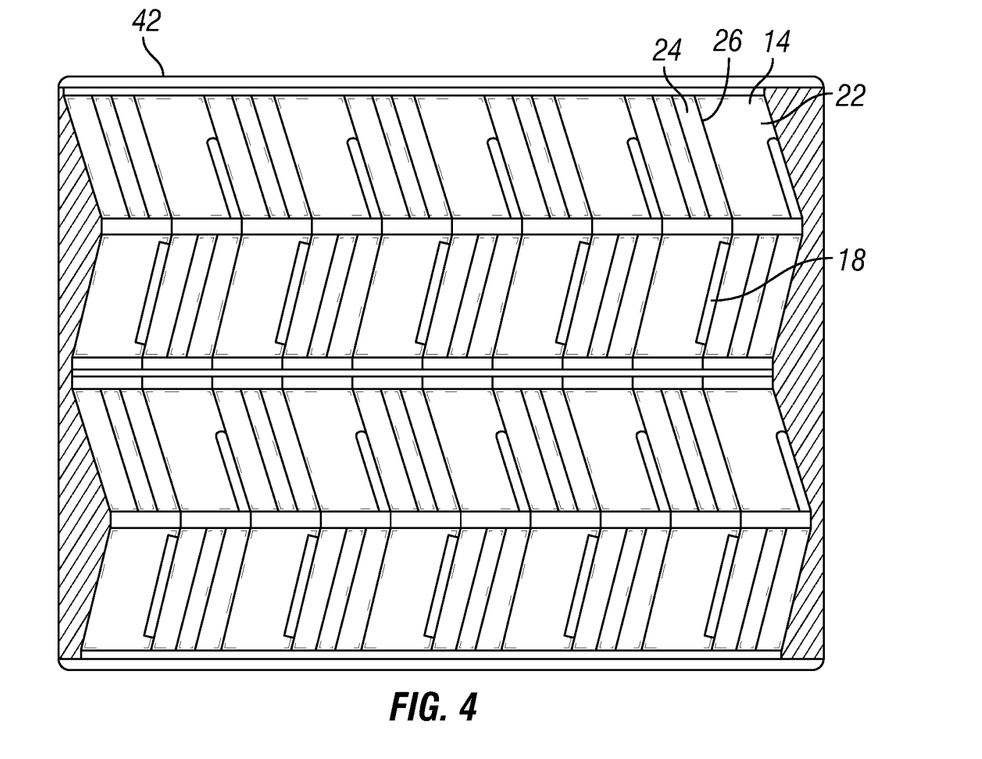
FIG. 4 is a front view of a sector of the mold.
Figure 5:
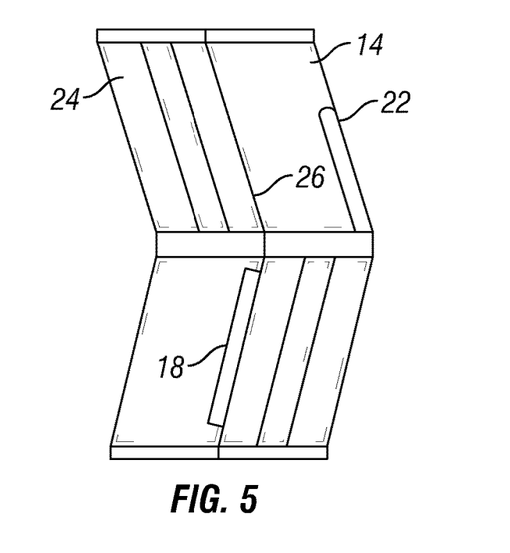
FIG. 5 is a front view of an interchangeable element.

FIG. 5 shows one of the interchangeable elements 14 from the sector 42 of FIG. 4. The interchangeable element 14 is made of two pieces that are a first portion 22 and a second portion 24. The two portions 22, 24 meet and engage one another at a decouple interface 26. The portions 22, 24 may be the same size as one another or one may be larger than the other. The interchangeable element 14 may feature one or more lamelles 18 that are used to form the sipes 20 into the tread 16. Although a single lamelle 18 is illustrated, the interchangeable element 14 may include any number of lamelles 18 in other embodiments. The lamelle 18 is located at the decouple interface 26. However, in other versions of the interchangeable element 14, the lamelle 18 is not located at the decouple interface 26, but is instead located away from the decouple interface 26 at an interior section of the first portion 22 or second portion 24. Also, although shown as comprising a pair of portions 22 and 24, the interchangeable element 14 in other exemplary embodiments need not include two or more portions but may instead be a single piece. However, even when configured as a single piece, the lamelle 18 is a separate piece from this single piece interchangeable element 14 and is releasably attachable to the interchangeable element 14.

Figure 6:
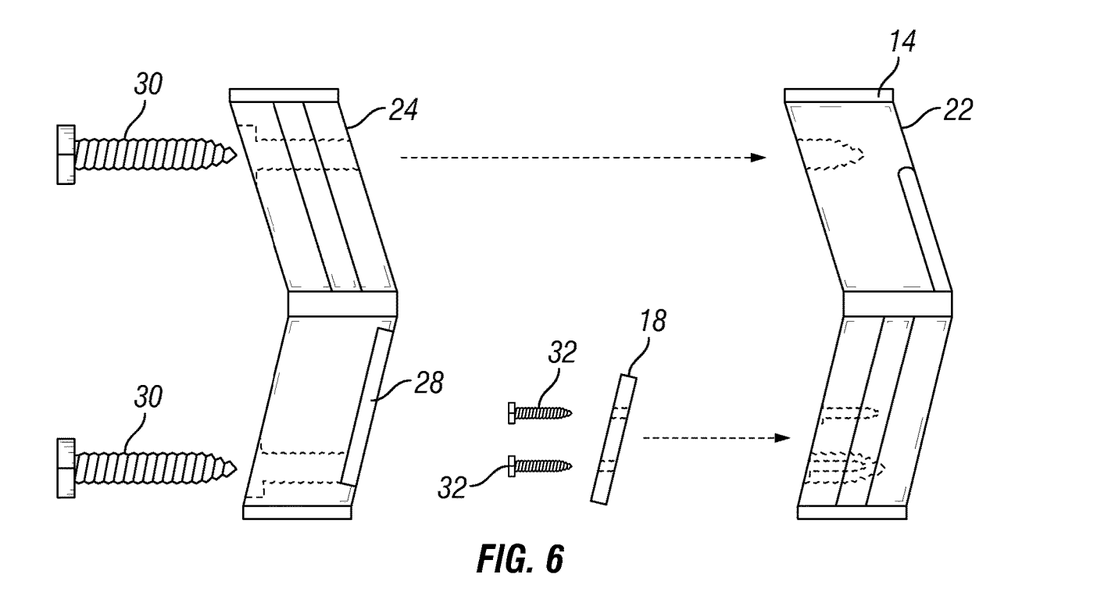
FIG. 6 is an exploded front assembly view of the interchangeable element of FIG. 5.

FIG. 6 shows a construction of the interchangeable element 14 in accordance with one exemplary embodiment. Here, the interchangeable element 14 is made up of a first portion 22 and a second portion 24 that are releasably attachable to one another through the use of a pair of portion to portion mechanical fasteners 30. Any number of fasteners 30 could be used in other embodiments. The portion to portion mechanical fasteners 30 are bolts as shown and extend through holes of the second portion 24 and engage threaded holes in the first portion 22. Rotation causes the threads of the portion to portion mechanical fasteners 30 to engage the internal threading of the first portion 22 to cause the two portions 22, 24 to be drawn against one another. The holds of the second portion 24 into which the portion to portion mechanical fasteners 30 are disposed may be countersunk so that the heads of the portion to portion mechanical fasteners 30 are flush with or below the side surface of the second portion 24. Although disclosed as using portion to portion mechanical fasteners 30 for attachment, any attachment mechanism can be used such as frictional fits or attachment of the portions 22, 24 instead to the sector 42 instead of to one another. The portion to portion mechanical fasteners 30 render the portions 22, 24 attachable and detachable so that they can be attached to and removed from one another, and then subsequently reattached.

Figure 7:
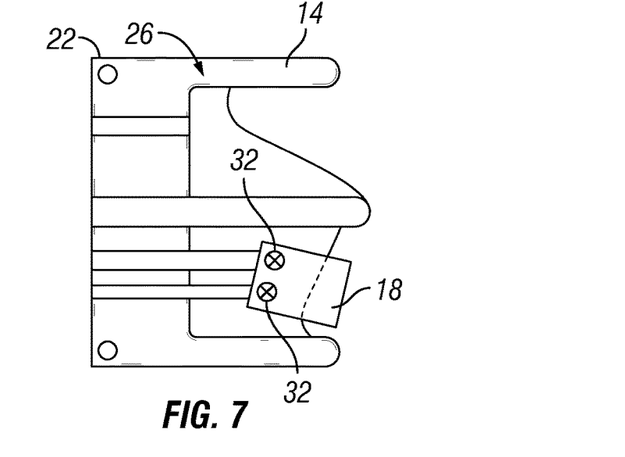
FIG. 7 is a front view of a first section and a lamelle of the interchangeable element of FIG. 5.

The lamelle 18 is releasably attached to the first portion 22 by way of a pair of lamelle mechanical fasteners 32. The lamelle mechanical fasteners 32 are a pair of bolts, but it is to be understood that any number of fasteners 32 could be used in other arrangements. The first portion 22 has a pair of holes with internal threading that extend only into a length of the first portion and not all of the way through the first portion 22. The lamelle 18 has a pair of holes without threading but with a countersunk portion. The lamelle mechanical fasteners 32 extend through the holes of the lamelles 18 and into the holes of the first portion 22, and external threading on the lamelle mechanical fasteners 32 engages the internal threading of the holes. The lamelle mechanical fasteners 32 may be tightened down so that the lamelle 18 is attached to the first portion 22 and so that the heads of the lamelle mechanical fasteners 32 are flush with the surface of the lamelle 18 due to the countersunk openings and heads. FIG. 7 shows the first portion 22 with the attached lamelle 18 secured by way of the lamelle mechanical fastners 32. The second portion 24 defines a recess 28 as shown in FIG. 6 that receives the lamelle 18 that rests on the side surface of the first portion 22. When the first and second portions 22, 24 are placed into engagement with one another the lamelle 18 fits within the recess 28 to provide clearance with the first and second portions 22, 24 to meet.

Although shown as having only a single lamelle 18, it is to be understood that the interchangeable element 14 may include multiple lamelles 18 in other embodiments. These multiple lamelles 18 may likewise be at the decouple interface 26, or could be at other places of the first and second portions 22, 24. Further, although shown as being attached to the first portion 22, the lamelle 18 could instead be attached to the second portion 24 with the recess 28 being defined in the first portion 22. After the interchangeable element 14 is used to mold the tire 12, if one desires to change the mold so that a different lamelle 18 in that particular interchangeable element 14 were used, the interchangeable element 14 may first be disconnected form the sector 42, next the portion to portion mechanical fasteners 30 may be disengaged to separate the first and second portions 22, 24. The lamelle mechanical fasteners 32 may then be disengaged to allow the lamelle 18 to be removed from the first portion 22 and for a new, desired lamelle 18 to be attached to the first portion 22 by reinsertion of the lamelle mechanical fasteners 32. The portions 22, 24 may again be attached by the portion to portion mechanical fasteners 30 and the resulting interchangeable element 14 can be attached to the sector 42.

Figure 8:
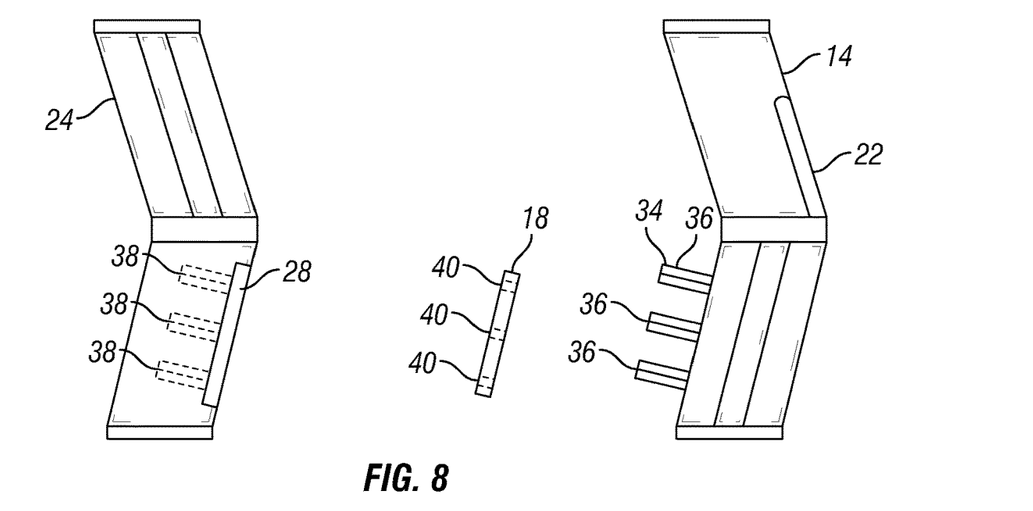
FIG. 8 is an exploded front assembly view of an alternate embodiment of the interchangeable element.
Figure 9:
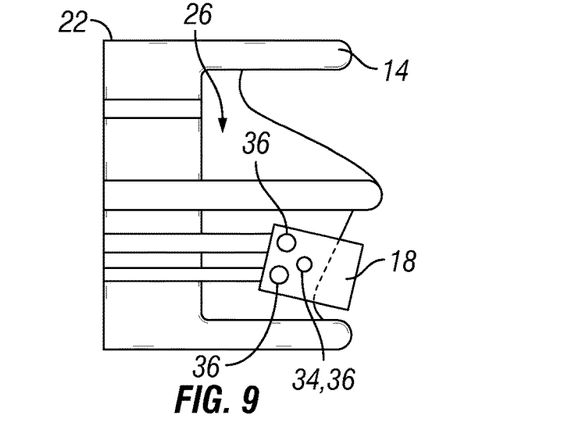
FIG. 9 is a front view of the first section and the lamelle of the interchangeable element of FIG. 8.

As stated, various types of connections may be used to render the lamelle 18 releasably attachable to the interchangeable element 14. FIGS. 8 and 9 illustrate another exemplary embodiment of the mold 10 in which an interlocking arrangement 34 is used to releasably connect the lamelle 18 to the interchangeable element 14. The interlocking arrangement 34 includes three projections 36 that extend from the side of the first portion 22. The three projections 36 each have a rectangular cross-sectional shape, and in some instances they may be square shaped or diamond shaped. The second portion 24 has three receiving voids 38 that have shapes and locations that are complimentary to those of the three projections 36. The receiving voids 38 may extend from the decouple interface 26 or may extend from the recess 28 to some portion in the interior of the second portion 24. The receiving voids 38 do not extend all the way through the second portion 24 but only part of the way through the second portion 24.

The lamelle 18 has three through apertures 40 that also have cross-sectional shapes and sizes that are complimentary to those of the projections 36. To secure the lamelle 18 to the interchangeable element 14, the lamelle 18 is slid over the projections 36 so that the projections 36 go through the through aperture 40, as shown for instance in FIG. 9. The second portion 24 may then be moved into engagement with the first portion 22 so that the projections 36 are inserted into the receiving voids 38. The sizes and shapes of the receiving voids 38 and through apertures 40 allow the projections 36 to be inserted therethrough and this fit could be a tight fit to ensure additional stability of the lamelle 18. Next, the first and second portions 22, 24 may be attached to one another by way of the portion to portion mechanical fasteners 30 or through any other mechanism. This attachment will squeeze the lamelle 18 between the first and second portions 22, 24 to secure the lamelle 18 to the interchangeable element 14. The connection is not permanent because if a different lamelle 18 is desired, the first and second portions 22, 24 can be disengaged and the lamelle 18 can be slid off of the projections 36 and removed and replaced with a desired lamelle 18. Although described and shown as using bolts and interlocking arrangements to render the lamelle 18 releasably attachable to the interchangeable elements 14, it is to be understood that any manner of releasably attaching these components is possible in accordance with various exemplary embodiments. The ability to replace just the lamelle 18 allows one to replace it if desired without having to scrap the entire interchangeable element 14. Further, although described as removing the lamelle 18 and replacing it with a different lamelle 18, it is to be understood that the originally removed lamelle 18 could be removed from the interchangeable element 14, and then subsequently reattached back to the same interchangeable element 14 as the releasable attachment configuration allows the lamelles 18 and interchangeable elements 14 to be attached and removed any number of times.

Figure 10:
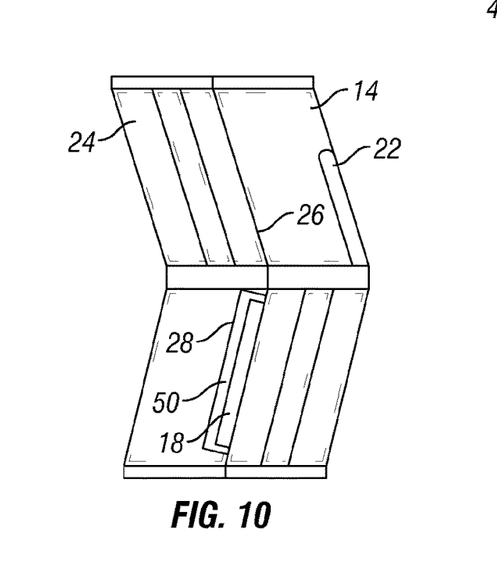
FIG. 10 is a front view of an interchangeable element with a vent.

FIG. 10 shows an alternate exemplary embodiment in which a vent 50 is present at the lamelle 18 so air that is heated through curing of the tire 12 has a path to escape. This vent 50 may extend from the front face of the interchangeable element 14 completely through the interchangeable element 14 to the sector 42 at which location a corresponding vent may allow the air to escape through the sector 42 to the atmosphere. Alternatively, the vent 50 may extend from the front face of the interchangeable element 14 to only an interior location of the interchangeable element 14 but not completely through the interchangeable element 14. In these instances, the air although not capable of completely escaping, the vent 50 affords a chamber into which the air may be located while the tire 12 is undergoing curing by the mold 10.

The recess 28 may be oversized in that it is larger than the lamelle 18 that is received by the recess 28. The portion of the recess 28 that is not filled by the lamelle 18 makes up the vent 50. The vent 50 can be located so that it is located completely on only one side of the lamelle 18 and not at all on the opposite side of the lamelle 18. In other versions, however, the geometry of the interchangeable element 14 and the lamelle 18 can be provided so that the vent 50 is in fact located on both sides of the lamelle 18. The vent 50 may run the complete width of the lamelle 18, or may be less than the entire width of the lamelle 18. The vent 50 may thus be defined partially by the lamelle 18 and partially by the body of the interchangeable element 14. The interchangeable element 14 may have other vents located therein that are not even partially defined by the lamelle 18 to allow for air to escape due to the differences in thermal expansion that may exist between different materials making up the interchangeable element 14, such as aluminum, and that making up the lamelle 18 such as steel.

The interchangeable element 14 may be formed by an injection molding process. Alternatively, injection molding need not be used to form the interchangeable element 14. In this regard, additive manufacturing, sometimes referred to as 3D printing direct laser sintered metal forming, or casting with direct machining can be used to construct the interchangeable element 14. The two portions 22, 24 may be formed by casting and the features on the decouple interface 26 and/or the recess 28 can be machined in their formation. The lamelle 18 may be constructed by the same technology as the interchangeable element 14, or may be made of a different technology such as casting, injection molding, stamping, or additive manufacturing. The mold 10 thus affords one flexibility in selecting the way the interchangeable elements 14 and lamelles 18 can be constructed, and injection molding of the interchangeable elements 14 need not be exclusively selected. Further, the two components 14 and 18 may be made from the same manufacturing process, or may be made from different manufacturing processes.

Figure 11:
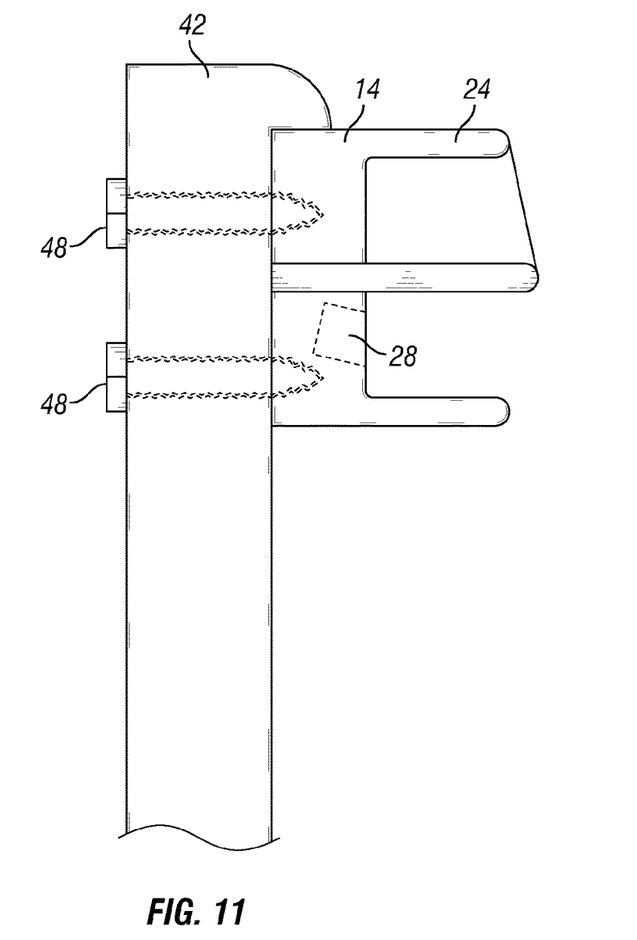
FIG. 11 is a side view of a portion of a sector with an attached second portion of the interchangeable element.

FIG. 11 is a side view of a portion of the sector 42 and the second portion 24 of the interchangeable element 14. A pair of sector to interchangeable element mechanical fasteners 48 are used to releasably attach the second portion 24 to the sector 42. The second portion 24 may have apertures that have internal threading, and the sector to interchangeable element mechanical fasteners 48 may extend through apertures of the sector 42 and into the apertures of the second portion 24 and have external threading that engages this internal threading. Tightening of the fasteners 48 may draw the second portion 24 against the sector 42 to hold the second portion 24 onto the sector 42. The fasteners 48 may be loosened and withdrawn in order to detach the second portion 24 from the sector 42 when a different interchangeable element 14 or lamelle 18 is desired in the mold 10. As the second portion 24 is attached to the sector 42, the first portion 22 with attached lamelle 18 can be attached to the second portion 24 to in turn be attached to the sector 42 without being directly attached to the sector 42. However, other embodiments are possible in which fasteners 48 directly engage both portions 22 and 24, or only engage the first portion 22 thus making the second portion 24 indirectly attached to the sector 42.

The sector 42 may have a lip or flange on its upper end against which the second portion 24 can be engaged when attached. Although described as being attached by way of the sector to interchangeable element mechanical fastener 48, a variety of techniques can be used to cause the interchangeable element 14 to be attached to and be capable of being removed from the sector 42. The various interchangeable elements 14 of the sector 42 can all be removably attached the same way as one another, or they may be attachable and removable via different mechanisms from one another.

All of the interchangeable elements 14 of the garniture 46 can be made of two portions 22, 24. In some instances, a garniture 46 may have 8 or 9 sectors 42 and may have 70 interchangeable elements 14. By dividing the interchangeable elements 14, there may thus be 140 pieces of interchangeable elements 14 in an equivalent mold 10. In some instances, one may desire to test multiple lamelle 18 configurations in which the interchangeable elements 14 have the same configuration as one another. By using different lamelles 18 within the same interchangeable elements 14 in the mold 10, the resulting tire 12 that is formed may have the same tread 16 patterns except for the sipes 20 which are different from one another. Further, should a customer desire a change in lamelles 18 in tires 12 that are being produced, the interchangeable lamelles 18 as disclosed will allow the resulting molds 10 to be more quickly manufactured with this change than would be the case in which the entire interchangeable elements 14 are all removed, manufactured, and installed. With the releasably attachable lamelles 18, they may be instead simply be inserted into the existing interchangeable elements 14. The releasable lamelles 18 facilitate bi-metallic constructions in which, for example, the lamelle 18 is formed of steel while the interchange able element 14 is made of aluminum. However, it is to be understood that both the lamelle 18 and the interchangeable element 14 can be made of the same material in other exemplary embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A mold for forming a tire, comprising:
    an interchangeable element, wherein the interchangeable element is configured for engaging the tire and forming a section of tread of the tire when the tire is molded by the mold; and
    a lamelle that is removably attachable to the interchangeable element, wherein the lamelle is configured for engaging the tire and forming a sipe of the section of tread of the tire, wherein the lamelle is removably attachable in that the lamelle is configured to be attached to the interchangeable element and then removed from attachment to the interchangeable element;
    wherein the lamelle is rendered removably attachable to the interchangeable element by an interlocking arrangement;
    wherein the interchangeable element comprising a first portion and a second portion that are configured for engagement with one another, wherein the interlocking arrangement comprising a projection that extends from the first portion and a receiving void defined by the second portion, wherein the lamelle has a through aperture, wherein when the lamelle is engaged to the interchangeable element the projection extends through the through aperture of the lamelle and into the receiving void of the second portion, and wherein when the lamelle is not engaged to the interchangeable element the projection does not extend through the through aperture of the lamelle.

2. The mold as set forth in claim 1, wherein the lamelle when attached to the interchangeable element is located at a decouple interface between the first portion and the second portion when the first portion and the second portion are in engagement.

3. The mold as set forth in claim 2, wherein the lamelle when attached to the interchangeable element is attached to the first portion, and wherein the second portion defines a recess into which a portion of the lamelle is disposed when the first portion and the second portion are in engagement.

4. The mold as set forth in claim 2, further comprising a portion to portion mechanical fastener that is configured to removably attach the first portion and the second portion, wherein the portion to portion mechanical fastener when engaged attaches the first portion and the second portion, and wherein the portion to portion mechanical fastener when not engaged does not attach the first portion and the second portion.

5. The mold as set forth in claim 1, wherein the projection has a rectangular shaped cross-section, and wherein the through aperture of the lamelle has a rectangular shaped cross-section that is complimentary to the cross-sectional shape of the projection, and wherein the receiving void has a rectangular shaped cross-section that is complimentary to the cross-sectional shape of the projection.

6. The mold as set forth in claim 1, further comprising:
    a plurality of sectors that form a garniture of the mold, wherein one of the sectors is removably attachable to the interchangeable element, wherein when the interchangeable element is attached to said one sector the lamelle is attached to the interchangeable element and the lamelle is free from engagement with said one sector; and
    a sector to interchangeable element mechanical fastener that is configured to removably attach the sector and the interchangeable element, wherein the sector to interchangeable element mechanical fastener when engaged attaches the sector to the interchangeable element, and wherein the sector to interchangeable element mechanical fastener when not engaged does not attach the sector and the interchangeable element.

7. The mold as set forth in claim 1, wherein when the lamelle is attached to the interchangeable element the lamelle and the interchangeable element define a vent that allows air to escape during curing of the tire by the mold.

8. The mold as set forth in claim 7, wherein the vent is located only on one side of the lamelle.

9. The mold as set forth in claim 1, wherein the interchangeable element is formed by a process selected from the group consisting of additive manufacturing and casting with subsequent machining.

10. The mold as set forth in claim 1, wherein the interchangeable element is not formed by injection molding.

11. The mold as set forth in claim 1, wherein the interchangeable element is made of aluminum, and wherein the lamelle is made of steel.

12. A mold for forming a tire, comprising:
    an interchangeable element, wherein the interchangeable element is configured for engaging the tire and forming a section of tread of the tire when the tire is molded by the mold; and
    a lamelle that is removably attachable to the interchangeable element, wherein the lamelle is configured for engaging the tire and forming a sipe of the section of tread of the tire, wherein the lamelle is removably attachable in that the lamelle is configured to be attached to the interchangeable element and then removed from attachment to the interchangeable element;
    wherein the interchangeable element comprising a first portion and a second portion that are configured for engagement with one another, and wherein the lamelle when attached to the interchangeable element is located at a decouple interface between the first portion and the second portion when the first portion and the second portion are in engagement;
    wherein the lamelle when attached to the interchangeable element is attached to the first portion, and wherein the second portion defines a recess into which a portion of the lamelle is disposed when the first portion and the second portion are in engagement.

13. A mold for forming a tire, comprising:

an interchangeable element, wherein the interchangeable element is configured for engaging the tire and forming a section of tread of the tire when the tire is molded by the mold;

a lamelle that is removably attachable to the interchangeable element, wherein the lamelle is configured for engaging the tire and forming a sipe of the section of tread of the tire, wherein the lamelle is removably attachable in that the lamelle is configured to be attached to the interchangeable element and then removed from attachment to the interchangeable element;

wherein the interchangeable element comprising a first portion and a second portion that are configured for engagement with one another, and wherein the lamelle when attached to the interchangeable element is located at a decouple interface between the first portion and the second portion when the first portion and the second portion are in engagement; and a portion to portion mechanical fastener that is configured to removably attach the first portion and the second portion, wherein the portion to portion mechanical fastener when engaged attaches the first portion and the second portion, and wherein the portion to portion mechanical fastener when not engaged does not attach the first portion and the second portion.

14. The mold as set forth in claim 13, further comprising a lamelle mechanical fastener that is configured to engage the lamelle and the interchangeable element, wherein the lamelle mechanical fastener when engaged attaches the lamelle and the interchangeable element, and wherein the lamelle mechanical fastener when not engaged does not attach the lamelle and the interchangeable element.

15. The mold as set forth in claim 14, wherein the lamelle mechanical fastener is a bolt.

\* \* \* \* \*